Oct. 23, 1928.  
W. LA HODNY  
1,689,035  
WINDSHIELD WING MOUNTING  
Filed June 10, 1925  
3 Sheets-Sheet 1

Oct. 23, 1928.
W. LA HODNY
1,689,035
WINDSHIELD WING MOUNTING
Filed June 10, 1925     3 Sheets-Sheet 2
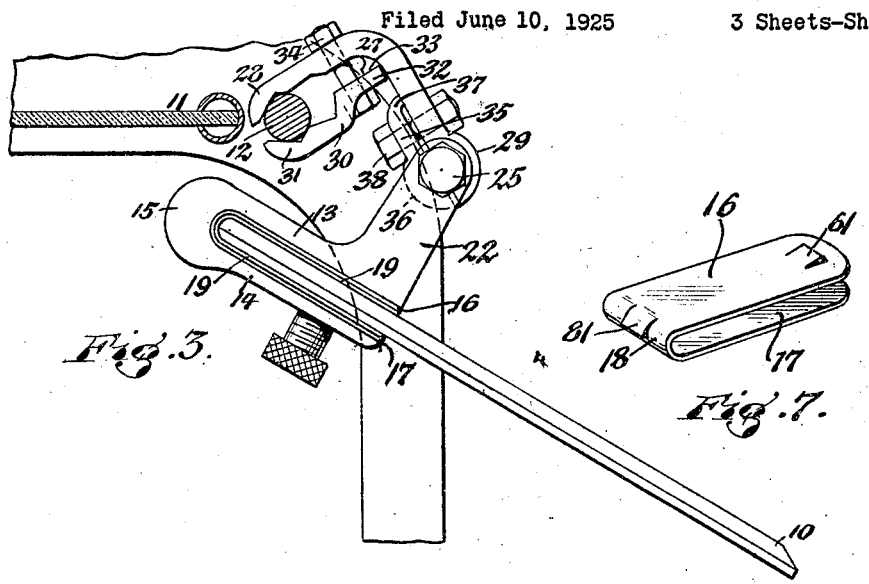
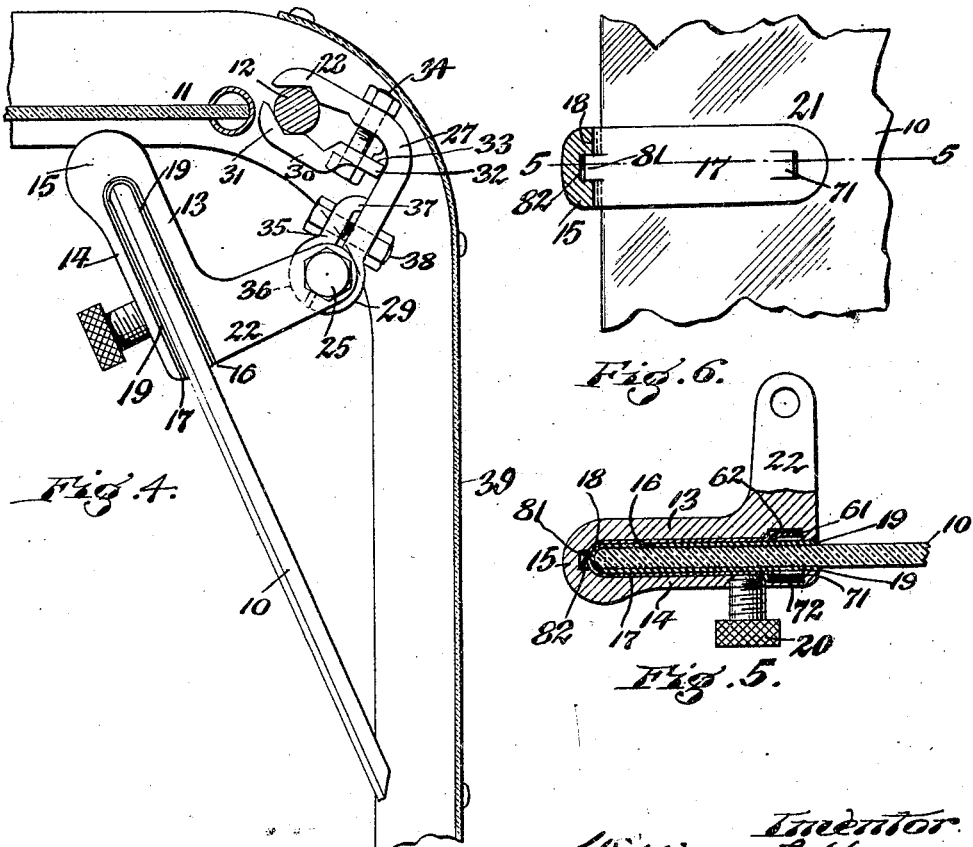

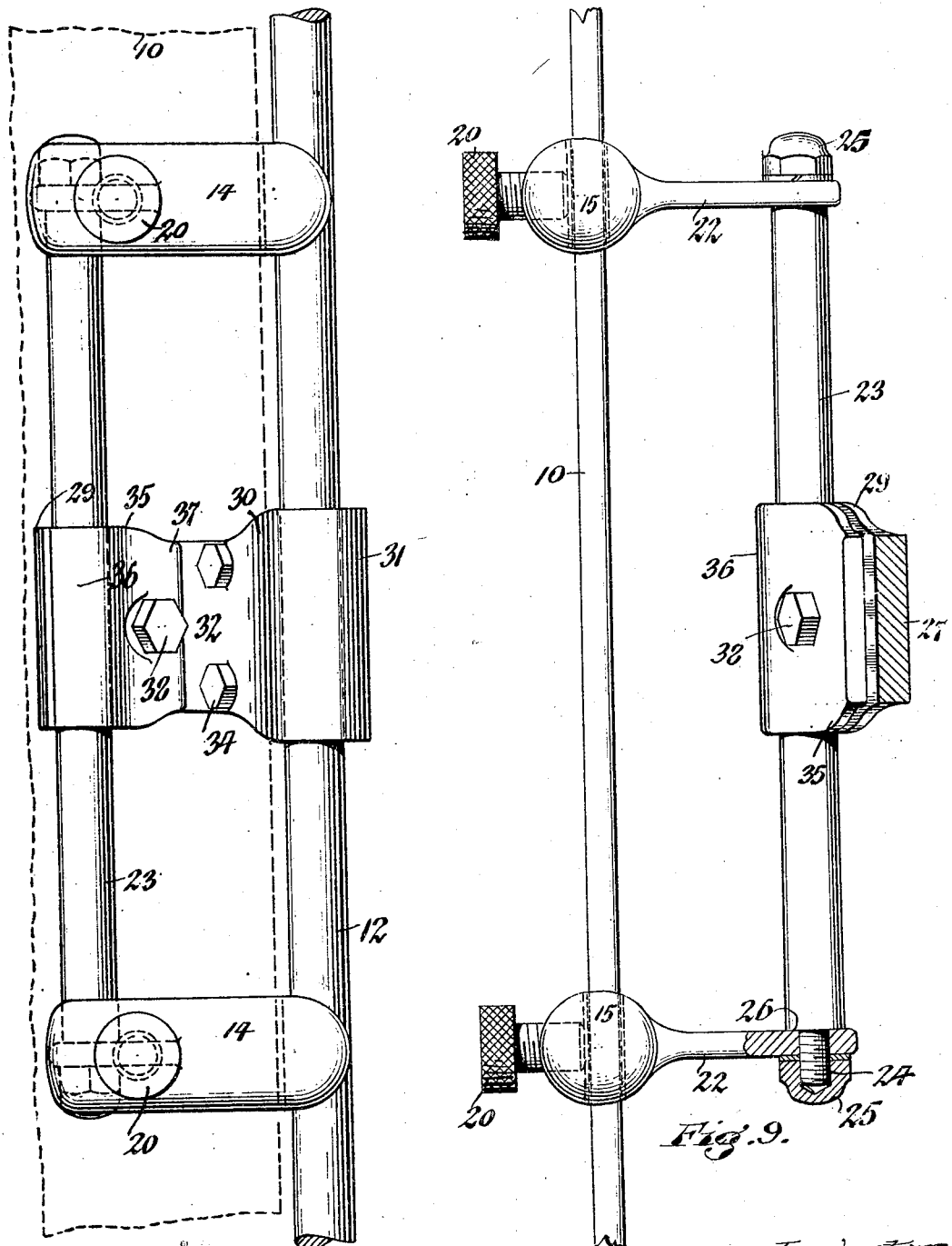

Patented Oct. 23, 1928.

1,689,035

UNITED STATES PATENT OFFICE.

WILLIAM LA HODNY, OF BUFFALO, NEW YORK, ASSIGNOR TO STANDARD MIRROR COMPANY INC., OF BUFFALO, NEW YORK, A CORPORATION OF NEW YORK.

WINDSHIELD-WING MOUNTING.

Application filed June 10, 1925. Serial No. 36,157.

This invention relates to a mounting for supporting a windshield wing on a windshield and has as its objects the provision of means which will firmly and securely grasp the wing and hold the same in place without perforating or grooving the wing and thereby weakening the same; also to provide means for attaching the bracket to an upright post or bar of an automobile regardless of its cross sectional form; and also to so organize the bracket that the wing can swing outwardly into an operative position at various angles to obtain the greatest protection according to the particular wind conditions; and also to permit of swinging the wing close into the car when the same is not required and permit of attaching the side curtains to the car without interfering with the wings and without unduly encroaching on the space intended for the passengers and inconveniencing the latter.

For this purpose this invention consists generally of a linkage having an elbow shaped inner link pivoted on the supporting post, an outer link pivotally connected with the inner link, and means for mounting the wing on said outer link so as to obtain the maximum grip thereon without the necessity of perforating or grooving the wing.

Figure 1:
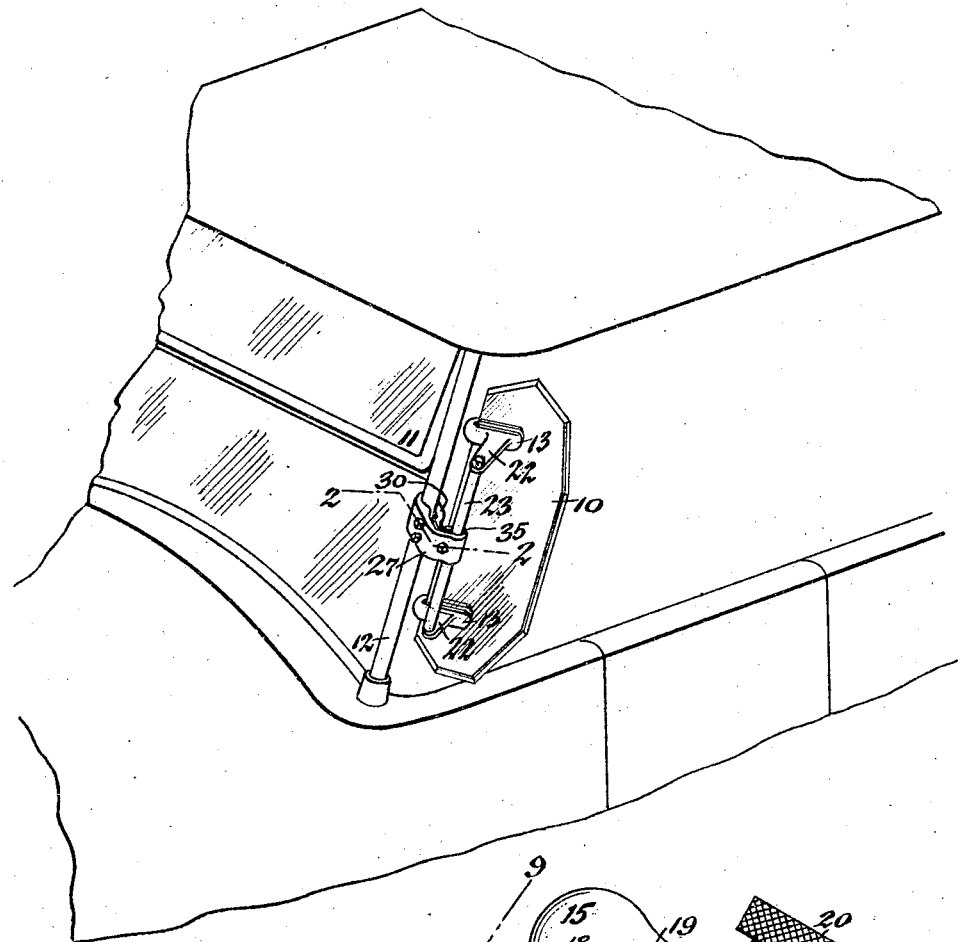
Figure 2:
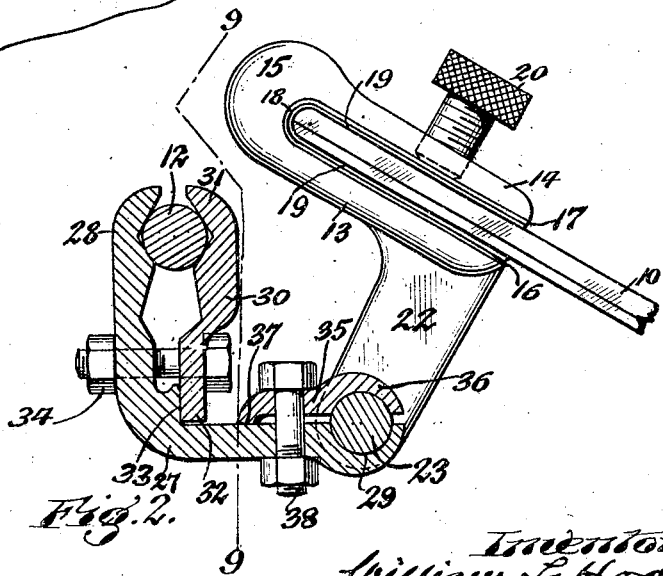

In the accompanying drawings:

Figure 1 is a fragmentary perspective view of an automobile equipped with my improved windshield wing mounting on its left hand side. Figure 2 is a fragmentary horizontal section, on an enlarged scale, taken on line 2—2, Fig. 1. Figure 3 is a horizontal section of the automobile taken above the right hand windshield wing and showing the latter and its mounting in top plan and in a position in which the wing projects laterally to a considerable extent from the car. Figure 4 is a similar view showing the wing swung inwardly into its inoperative position within the side curtains which have been attached to the car. Figure 5 is a horizontal section of one of the clamps of the wing mounting, the section being taken on line 5—5, Fig. 6. Figure 6 is a fragmentary sectional elevation of the wing and the adjacent part of the mounting showing the manner of gripping the same to permit of holding it securely without perforating or grooving. Figure 7 is a perspective view of the bearing clip forming part of this mounting. Figure 8 is a front elevation of the wing mounting for the left-hand side of the car. Figure 9 is a vertical section taken on line 9—9, Fig. 2.

Similar characters of reference indicate like parts throughout the several views.

The numeral 10 represents the windshield wings which are arranged at horizontally opposite ends of the windshield 11 of the automobile and serve to protect the passengers from the wind. These wings are constructed of glass, as usual and the same are pivotally supported on the upright bars, rods or posts 12 on the ends of the windshield frame by means of mountings which embody my invention and each of which in its preferred form is constructed as follows:

Upon the upper and lower parts of the inner edge of each windshield wing the same has mounted thereon upper and lower supporting heads each of which is of U-shaped form and embraces the inner edge of the wing and has its front jaw 13 arranged in front of the wing and its rear jaw 14 in rear of the same while its web 15 extends across the inner edge of the wing.

Between each supporting head and the wing is arranged a clamping clip of U-shape and bearing with its front leg 16 against the front side of the wing, and with its rear leg 17 against the rear side of the wing, while its web 18 is interposed between the inner edge of the wing and the crotch or web of the respective supporting head. Vertical displacement of this clip in the supporting head is prevented by means of laterally projecting locking tongues 61, 71 stamped outwardly from the side of the front ends of the legs of the clip and adapted to engage with front recesses 62, 72 on the inner side of the outer ends of the jaws of the head, and a locking tongue 81 stamped outwardly from the inner turn 18 of the clip and engaging with a rear recess 82 in the web of the supporting head, as shown in Figures 5 and 6. This clip is firmly clamped against opposite sides of the wing and held on the respective supporting head by a clamping screw 20 working in a threaded opening in the rear jaw of the head and engaging with the rear leg of the clip, as best shown in Figure 5. In order to enable the clip to obtain a firm grip on the glass windshield wing and prevent these parts from slipping on each other, a U-shaped strip 19 of rubber or similar material is interposed between each clip and the adjacent surface of the wing, which strip also serves to cushion the contact between the supporting head and the wing.

The front or outer jaw of each supporting head is provided at its free end with a forwardly projecting pivot lug 22 and these lugs of the corresponding heads of a wing are connected with the upper and lower ends of an upright pivot rod 23 by means of reduced threaded shanks 24 arranged on the upper and lower ends of the pivot rod and passing through openings in the outer ends of said pivot lugs, and screw nuts 25 arranged on said shanks and operating when tightened to clamp each pivot lug between one of the shoulders 26 at the base of the respective shank and the screw nut working thereon, as shown in Figure 9.

Means are provided for pivotally connecting each pivot rod 23 with the respective supporting rod 12 which means in their preferred form are constructed as follows:

The numeral 27 represents an L-shaped link bar which has its corner or angle projecting outwardly and which is provided at its opposite ends with jaws 28, 29 adapted to engage with the outer sides of the central parts of the supporting rod 12 and the pivot rod 23. The front jaw of this link bar is held frictionally in engagement with the front or outer side of the supporting rod 12 by a front clamping plate 30 having a front jaw 31 engaging with the rear side of the supporting rod 12, and a rear tail 32 fulcrumed on a shoulder 33 on the link bar, and a clamping screw or bolt 34 connecting the central part of the front clamping plate 30 with the front leg of the elbow shaped link bar. The rear jaw of the link bar is held frictionally in engagement with the inner side of the central part of the pivot rod 23 by a rear clamping plate 35 having an outer or front jaw 36 engaging with the inner side of the pivot rod 23 and an inner or rear tail 37 fulcrumed on the adjacent part of the inner side of the rear leg of said elbow shaped link bar, and a clamping bolt or screw 38 connecting the rear clamping plate between its jaw and tail with the adjacent part of the rear leg of said link bar, as best shown in Figures 2, 3 and 4. By tightening the bolts 34, 38 the proper extent of the jaws of the link bar 27 and plates 30, 35 will engage the rods 12 and 23 sufficiently firm so that the wing can be turned by hand into the desired angular position, as best suits wind conditions and will be held frictionally in position after such adjustment without liability of being displaced by wind pressure.

By making the link bar in the form of an elbow which crooks outwardly it is possible to bring the pivot rod 23 much closer to the supporting rod and thereby secure not only a more compact structure but also close the gap between the wing and the windshield for excluding wind from the passengers.

The link bar and its clamping plates in effect form a front link, and the pivot lug 22 and associated parts on the outer side of the wing form in effect a rear link, which links together form a linkage whereby the wing can be swung outward, as shown in Figure 3, for obtaining protection against the wind, and the same can also be swung inwardly within the outline of the car body and thus permit the curtains 39 to be attached to the body for enclosing the passengers during inclement weather without interference from the windshield wings and without necessitating removal of the wings when it is desired to use the side curtains.

I claim as my invention:—

A mounting for windshield wings including a U-shaped head having jaws adapted to be arranged on opposite sides of the edge portion of a wing and provided on the end portions of their inner sides with front recesses and in the bight between said jaws with rear recesses; a U-shaped clip having its legs arranged between the jaws of the head and the sides of the windshield and having laterally projecting tongues stamped out of the end portions of said legs and engaging with said front recesses and also having a tongue stamped out of the turn of said clip and engaging with said rear recess; and a clamping screw arranged on one of said jaws and engaging with one of the legs of the clip.

WILLIAM LA HODNY.